United States Patent [19]

Casad

[11] 4,071,756

[45] Jan. 31, 1978

[54] DETERMINATION OF RESIDUAL OIL IN A SUBTERRANEAN FORMATION

[75] Inventor: Burton M. Casad, Ponca City, Okla.

[73] Assignee: Continental Oil Company, Ponca City, Okla.

[21] Appl. No.: 684,989

[22] Filed: May 10, 1976

[51] Int. Cl.² .............................................. G01V 5/00
[52] U.S. Cl. ...................................... 250/260; 250/259
[58] Field of Search ......................... 250/256, 259, 260

[56] References Cited

U.S. PATENT DOCUMENTS

| | | | |
|---|---|---|---|
| 2,385,378 | 9/1945 | Piety | 250/260 |
| 3,129,331 | 4/1964 | Bourne, Jr. et al. | 250/260 |
| 3,562,523 | 2/1971 | Richardson et al. | 250/259 |
| 3,628,011 | 12/1971 | Wyman | 250/259 |
| 3,631,245 | 12/1971 | Jorden, Jr. et al. | 250/259 |
| 3,894,584 | 7/1975 | Fertl | 250/260 X |

Primary Examiner—Archie R. Borchelt
Attorney, Agent, or Firm—A. Joe Reinert

[57] ABSTRACT

A method for obtaining logging data for use in the determination of the amount of residual oil in a subterranean oil bearing formation, the method comprising the steps of logging the formation, injecting into the formation an aqueous solution of a water soluble radioactive tracer compound, logging the formation, injecting into the formation a second aqueous solution of a radioactive tracer compound which is soluble in both water and oil, and thereafter logging the formation.

8 Claims, 1 Drawing Figure

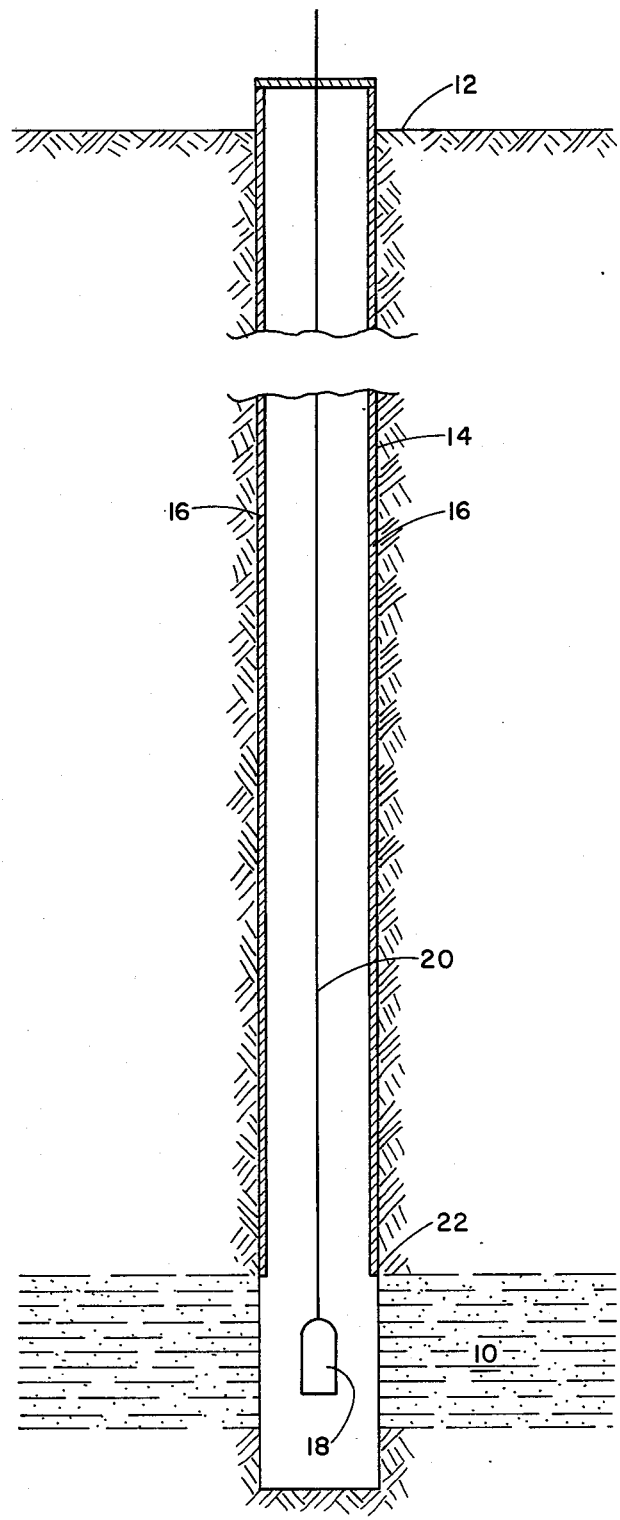

DETERMINATION OF RESIDUAL OIL IN A SUBTERRANEAN FORMATION

This application relates to methods for the determination of the amount of residual oil in a subterranean oil bearing formation.

The determination of the amount of oil in place in subterranean reservoirs has been a subject of considerable interest to the oil industry for many years. Such information is obviously of considerable interest in the case of newly discovered reservoirs which are to be produced and is of even greater interest in reservoirs which have been subjected to primary production and possibly secondary production. In recent years the increased interest in recovering additional quantities of oil from reservoirs which have been subjected to primary and secondary production by tertiary recovery methods such as surfactant flooding and the like, has increased. Since such tertiary oil recovery methods are quite expensive it is necessary that a method be available for determining the amount of residual oil in a formation to be subjected to tertiary recovery prior to the initiation of the tertiary recovery operation. The residual oil present in reservoirs which have been subjected to primary or secondary recovery is oil which remains in place after waterflooding operations, after water flushing as for instance, by a strong water drive or the like. Such residual oil resists recovery by conventional methods such as pumping, waterflooding, or the like. Such residual oil is trapped in the formation pores or otherwise retained in the formation by various mechanisms many of which are only partially understood at the present. In any event such oil while recoverable in many instances by tertiary recovery operations is not recoverable by primary or secondary oil recovery operations.

As a result of the increasing interest in the recovery of additional quantities of oil from old reservoirs which have been subjected to secondary recovery operations the oil industry has directed a continuing effort to the development of improved methods for determining the amount of residual oil in formations which have been subjected to secondary recovery.

It has now been found that the amount of residual oil present in subterranean oil bearing formations which have been subjected to secondary recovery is readily determined by a method which comprises the steps of logging the formation, thereafter injecting into the formation a first aqueous solution of a water soluble radioactive tracer material; logging the formation; injecting into the formation a second aqueous solution of a radioactive compound which is soluble in both oil and water; and thereafter logging the formation a third time.

The FIGURE shows an oil well penetrating a hydrocarbon bearing formation which has been subjected to secondary recovery.

The present invention comprises a method for obtaining logging data for use in the determination of the amount of residual oil in a subterranean oil-bearing formation which has been penetrated by the wellbore of a well and which has been subjected to waterflooding for the secondary recovery of oil therefrom, said method comprising:

a. logging the formation to obtain logging data measurements of the natural radioactivity of the formation;

b. injecting into the formation through said wellbore a first aqueous solution of a first compound, said first compound
 1. being water-soluble and substantially insoluble in said residual oil;
 2. containing at least one radioactive constituent; and,
 3. being present in said first aqueous solution in an amount sufficient to provide from about 0.05 to about 5.0 microcuries of radioactivity per cc of injected fluid,
said first aqueous solution being injected in an amount sufficient to displace substantially all of the formation water present in the zone under investigation;

c. logging the formation after the injection of said first aqueous solution to obtain logging data measurements of the radioactivity of said formation after the injection of said first aqueous solution;

d. injecting into said formation through said wellbore a second aqueous solution of a second compound, said second compound
 1. being soluble in both oil and water;
 2. having an equilibrium partition ratio, $R_{o/w}$, greater than 1.0, $R_{o/w}$ being defined as the concentration of said second compound in said residual oil divided by the concentration of said second compound in water at equilibrium;
 3. containing the same radioactive constituent present in said first compound; and,
 4. being present in said second aqueous solution in an amount sufficient to provide from about 0.05 to about 5.0 microcuries of radioactivity per cc of injected fluid
said second solution being injected in a sufficient volume to result in substantial equilibrium between the concentration of said second compound in said residual oil and said second aqueous solution in said zone under investigation; and, e. logging the formation after the injection of said second aqueous solution to obtain logging data measurements of the radioactivity of said formation after the injection of said second aqueous solution.

The FIGURE shows an oil well which penetrates a subterranean formation 10 from the surface 12. A wellbore 14 which contains a casing 16 positioned from surface 12 to formation 10 is shown. A logging tool 18 is shown positioned by a positioning means 20 in wellbore 14 beneath the lower end 22 of casing 16.

In the practice of the method of the present invention a gamma ray log of the formation is run. Desirably the gamma ray log traverses formation 10 and a portion of the wellbore above lower end 22 of casing 16. After the first log has been run, an aqueous solution of a first compound is injected into formation 10 in an amount sufficient to displace substantially all of the formation water present in the zone under investigation. The zone under investigation comprises the space around wellbore 14 radially, extending radially outward for a distance of at least 1 inch and up to about 3 feet. The first aqueous solution is an aqueous solution containing a water soluble radioactive tracer wherein the radioactive tracer is desirably a radioactive isotope selected from the group consisting of radioactive isotopes of iodine, bromine, potassium, sodium, cobalt, tantalum, managanese, gold, zinc, silver, cesium and the like. Some suitable tracer isotopes are bromine 82, gold 198, manganese 52, iodine 131, iron 59, tantalum 182, zinc 65, silver 100, cesium 134, sodium 22, cobalt 60 and the like. Substantially any water soluble inorganic salt of the radioactive isotopes can be used, but it is essential that the tracer be injected in a form in which it is substantially completely water soluble and oil insoluble. The radioactive tracer obviously can be selected from a variety of radioactive isotopes although it is preferred that the radioactive tracer be selected from those materials which have a half life of at least 10 days and from those isotopes which emit radiation of at least 1.0 Mev (Million electron volts).

The well is then logged again in the same manner as the first log and thereafter a second aqueous solution is injected. The second aqueous solution contains a second compound which is soluble in both oil and water in a ratio defined by an equilibrium partion ratio $R_{o/w}$ wherein $R_{o/w}$ is defined as the concentration of the second compound in the oil divided by the concentration of the second compound in the water at equilibrium. The second compound has an $R_{o/w}$ greater than 1 with $R_{o/w}$ preferably varying from about 20 to about 50. The radioactive tracer used in the second aqueous solution is the same radioactive tracer as that used in the first solution. Some suitable materials for use as the second compound are as follows:

a. radioactive metal isotope salts of alkylated aromatic sulfonates having an equivalent weight from about 350 to about 600 and characterized by the general formula:

R—AR wherein R is an alkyl group containing from about 1 to about 30 carbon atoms and wherein Ar is a benzene, naphthalene, anthracene, phenanthrene, tetralin, indane, heterocyclic or the like group;

b. radioactive metal isotope salts of carboxylic acids, such as tall oils, containing from about 15 to about 30 carbon atoms;

c. radioactive metal isotope salts of sulfurized phenates having the general structure:

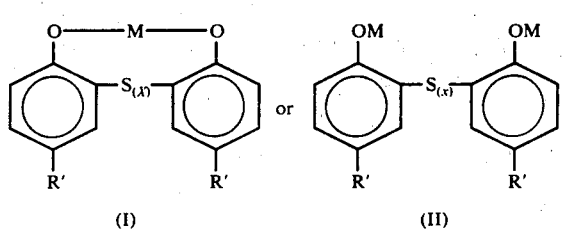

(I)       (II)

wherein (x) varies from about 1 to about 5, R' is an alkyl group containing from about 1 to about 20 carbon atoms and wherein M is a radioactive metal isotope having a valence from 1 to about 2;

d. radioactive metal isotope salts of alkyl substituted phenates having the general formula:

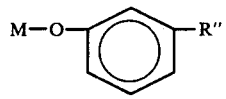

wherein M is a radioactive metal isotope having a valence from 1 to 2 and wherein R''' is a an alkyl group containing from about 1 to about 20 carbon atoms;

e. halogenated phenols having the general formula

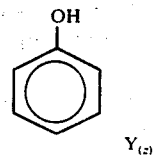

wherein Y is a radioactive halogen isotope and wherein (Z) varies from 1 to 3;

f. alkyl substituted halogenated phenols having the general formula

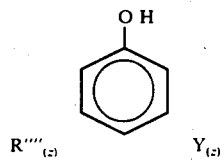

wherein Y and (Z) are as defined in (e) above, R''' is an alkyl group containing from about 1 to about 10 carbon atoms and wherein (Z) varies from 1 to 3;

g. halogenated phenates having the general formula

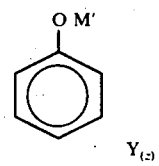

wherein M is a radioactive metal isotope or an alkyl moiety containing from about 1 to about 10 carbon atoms and Y is a halogen and (Z) is as defined in (e) above;

h. quaternary ammonium halides having the general formula

R₄'''' NY wherein R'''' is an alkyl group containing from about 1 to about 20 carbon atoms with the total of carbon atoms contained in all the R'''' groups being from about 15 to about 30 and wherein Y is as defined in (e)

and the like.

Some specific examples of such compounds are: potassium octadecylbenzenesulfonate, potassium stearate, potassium dodecylphenate, paraiodophenol, meta dodecylparaiodophenol, potassium paraiodophenate, tetrahexylammonium iodide, dihexyl-dimethylammonium iodide and the like.

The second aqueous solution containing the second compound is injected in a sufficient volume to result in substantial equilibrium between the concentration of the second compound in the residual oil and the second aqueous solution being rejected. Quite clearly the achievement of such equilibrium from a theoretical point of view is difficult to obtain but practical equilibrium is attainable particularly when $R_{o/w}$ varies from about 20 to about 50. When the injection of the second aqueous solution has been completed the well is logged for a third time in the same manner as the first log.

The gamma ray logging is conducted by techniques known to those skilled in the art using equipment commonly used for such purposes and since such techniques and equipment are well-known it is not considered necessary to further discuss the gamma ray logging operation. It is pointed out however, that desirably the gamma ray log traverses the formation on each of the logging runs and continues upwardly for a short distance into the wellbore beyond the bottom of casing 22. Such is for the purpose of determining the radiation associated with the fluid filling the borehole at the time of the log. Quite obviously this radiation is generated by the materials then occuping the wellbore and may vary depending upon the materials recently injected into the wellbore and the like.

The zone under investigation by the use of the present method comprises a zone extending radially outwardly from the wellbore for a distance of at least 1 inch and desirably from about 1 inch to about 3 feet. Preferably the zone under investigation comprises that portion of the formation extending radially outwardly from the wellbore for a distance of about 10 inches.

The term "residual oil" as used herein refers to oil which remains in place in the subterranean formation after waterflooding, water flushing as for instance by a strong water drive or the like. Such oil is not readily removed from the formation by further water flushing.

In the practice of the method of the present invention it is possible to determine when an effective amount of both the first and second aqueous solution has been injected into the formation by logging the formation and thereafter injecting additional material and logging again. When there is no substantial difference between the results obtained on repeated logs the formation has been saturated with the first aqueous solution or in the case of the second aqueous solution substantial equilibrium has been obtained.

The zone of greatest interest is clearly that zone which lies closest by the wellbore since the radioactive emissions from the material injected are detected in an amount inversely proportional to the distance between the radioactive material and the detecting device. It is quite clear that at least 90 percent of the radioactivity detected by the gamma ray log is generated by that radioactive material in the first few inches of the formation, accordingly it is believed that the zone which is most commonly of interest is that zone which extends radially outwardly from the wellbore for a distance of up to about ten inches.

The data collected from the logging runs is used to determine the residual oil saturation in the formation as shown below.

For the logging run after injection of the first aqueous solution where $R_{o/w} = 0$ $$\phi_t = \phi_b + \phi_n + \phi_{w_1} \tag{1}$$

and for the logging run after injection of the second aqueous solution where $R_{o/w} > 1.0$ $$\phi_{t_2} = \phi_b + \phi_{w_2} + \phi_o \tag{2}$$

where
$\phi$ = gamma ray flux
$\phi_t$ = total measured flux
$\phi_b$ = flux from material in the wellbore
$\phi_n$ = flux from naturally occurring isotopes
$\phi_{w_1}$ = flux from material in the first aqueous solution
$\phi_{w_2}$ = flux from material in the second aqueous solution
$\phi_o$ = flux from material in the oil in the formation
$\phi_n$ is determined by the first logging run prior to the injection of the first aqueous solution and $\phi_b$ is readily determined by logging a portion of the wellbore above the formation at a time when the wellbore is filled with a material of interest, $\phi_{w_1}$ and $\phi_{w_2}$ and $\phi_o$ are determined from the logging runs after the injection of the first aqueous solution and the second aqueous solution respectively.

$\phi_o$ is proportional to $S_o$, $C_o$ and the formation porosity P and $\phi_w$ is proportional to $S_w$, $C_w$ and formation porosity P so that:

$$\phi_o = KS_o PC_o \tag{3}$$

and $$\phi_w = KS_w PC_w \tag{4}$$

where
$K$ = a proportionality constant
$S_o$ = oil saturation
$S_w$ = water saturation
$C_o$ = concentration of tracer material in the oil
$C_w$ = concentration of tracer material in the water
The following equation may then be written $$\frac{\phi_o}{\phi_w} = \frac{KS_o PC_o}{KS_w PC_w} \tag{5}$$

and since P and K are constant for a given formation and a given oil-water system and since $C_o = R_{o/w}C_w$; $R_{o/w}$ being defined as $R_{o/w} = C_o/C_w$ then equation (5) may be simplified to $$\frac{S_o}{S_w} = \frac{\phi_o}{\phi_w R_{o/w}} \tag{6}$$

and since $S_o + S_w = 1.0$ equation (6) may be rewritten as $$S_o = \frac{\left(\frac{\phi_o}{\phi_w R_{o/w}}\right)}{\left(1 + \frac{\phi_{o_o}}{\phi_w R_{o/w}}\right)} \tag{7}$$

all the information needed to calculate $S_o$ by the use of equation (7) is available from the logging runs so that by substitution of the defined values into equation (7) the residual oil present in a given formation is readily determined.

Having thus described the invention it is pointed out that the foregoing description of preferred embodiments is illustrative rather than limiting in nature and that many variations and modifications are possible within the scope of the present invention. It is anticipated that many such variations and modifications within the scope of the present invention may appear obvious or desirable to those skilled in the art based upon a review of the foregoing description of preferred embodiments.

Having thus described the invention I claim:

1. A method for obtaining logging data, for use in determination of the amount of residual oil in a subterranean oil-bearing formation which has been penetrated by the wellbore of a well and which has been subjected to waterflooding for the secondary recovery of oil therefrom, said method comprising;

a. logging the formation to obtain logging data measurements of the natural radioactivity of the formation;

b. injecting into the formation through said wellbore a first aqueous solution of a first compound, said first compound
 1. being water-soluble and substantially insoluble in said residual oil;
 2. containing at least one radioactive constituent; and,
 3. being present in said first aqueous solution in an amount sufficient to provide from about 0.05 to about 5.0 microcuries of radioactivity per cc of injected fluid, said first aqueous solution being injected in an amount sufficient to displace substantially all of the formation water present in the zone under investigation;

c. logging the formation after the injection of said first aqueous solution to obtain logging data measurements of the radioactivity of said formation after the injection of said first aqueous solution;

d. injecting into said formation through said wellbore a second aqueous solution of a second compound, said second compound
 1. being soluble in both oil and water;
 2. having an equilibrium partition ratio, $R_{o/w}$, greater than 1.0, $R_{o/w}$ being defined as the concentration of said second component in said residual oil divided by the concentration of said second component in water at equilibrium;
 3. containing the same radioactive constituent present in said first compound; and,
 4. being present in said second aqueous solution in an amount sufficient to provide from about 0.05 to about 5.0 microcuries of radioactivity per cc of injected fluid said second solution being injected in a sufficient volume to result in substantial equilibrium between the concentration of said second compound in said residual oil and said second aqueous solution in said zone under investigation; and, e. logging the formation after the injection of said second aqueous solution to obtain logging data measurements of the radioactivity of said formation after the injection of said second aqueous solution.

2. The method of claim 1 wherein said zone under investigation comprises a zone extending radially outwardly from said wellbore for a distance of at least 1.0 inch and extending longitudinally along the axis of the portion of said wellbore penetrating said formation.

3. The method of claim 2 wherein said distance is from about 0.1 to about 3 feet.

4. The method of claim 3 wherein said distance is from about 6 to about 9 inches.

5. The method of claim 2 wherein said second aqueous solution is injected into said formation in an amount such that injection of further amounts results in no substantial change in the radioactivity measured in the wellbore by repeated logging runs.

6. The method of claim 2 wherein said first compound is selected from the group consisting of radioactive inorganic salts of iodine, bromine, potassium, sodium, cobalt, tantalum, manganese, gold, zinc, silver, and cesium.

7. The method of claim 6 wherein said first compound is selected from the group consisting of potassium bromide, potassium iodide, sodium bromide and cobaltous chloride.

8. The method of claim 2 wherein said equilibrium partition ratio is from about 20 to about 50.

* * * * *